United States Patent [19]
Kojima et al.
[11] Patent Number: 4,990,171
[45] Date of Patent: Feb. 5, 1991

[54] LUBRICANT SPRAY NOZZLE ON A GUIDE RAIL FOR GLASS BOTTLE MOLDS

[75] Inventors: Hajime Kojima, Gifu; Akihiko Ono, Hashima, both of Japan

[73] Assignees: Kabushiki Kaisha N-Tech; Nihon Taisanbin Kogyo Kabushiki Kaisha, both of Ogaki, Japan

[21] Appl. No.: 444,911

[22] Filed: Dec. 4, 1989

[30] Foreign Application Priority Data

Dec. 6, 1988 [JP] Japan ........................ 63-158763[U]

[51] Int. Cl.^5 ........................ C03B 40/00
[52] U.S. Cl. ........................ 65/169; 65/26
[58] Field of Search ........................ 65/24, 26, 169, 170; 239/752

[56] References Cited

U.S. PATENT DOCUMENTS 3,988,137 10/1976 Goodwin ........................ 65/26
4,392,880 7/1983 Dohms ........................ 65/262
4,765,821 8/1988 Doud ........................ 65/170
4,767,437 8/1988 Lampman et al. ........................ 65/273

*Primary Examiner*—David L. Lacey
*Assistant Examiner*—John J. Bruckner
*Attorney, Agent, or Firm*—Armstrong, Nikaido, Marmelstein, Kubovcik & Murray

[57] ABSTRACT

Apparatus for applying lubricant onto a molding die in a glass bottle making machine, including a spraying nozzle for spraying a mist of lubricant mixed with air onto an inner surface of the molding die, located on a guide rail above an array of a plurality of molding dies, and a cylinder which is connected to the spraying nozzle to reciprocally move the spraying nozzle between a spraying position directly above the molding die and an inoperative position apart from the spraying position.

6 Claims, 5 Drawing Sheets 30
31
10
21
23
32
33
20
22
24
12
12
11
13
14
15
M
M1
M2 air
1
2
3
4
5
6
7
8
72
70
71
U
SV1
SV2
SV3
control unit
air
oil
P
T

LUBRICANT SPRAY NOZZLE ON A GUIDE RAIL FOR GLASS BOTTLE MOLDS

BACKGROUND OF THE INVENTION

1. Field of the Invention

The present of the invention relates to an apparatus for intermittently applying lubricant to an inner surface of a molding die in a machine of making a glass bottle.

2. Description of the Related Art

In a glass bottle making machine, lubricant, such as an oil containing carbon powder or the like is applied onto a molding surface of a molding die, for example to ensure a smooth charge of a gob (gob of molten glass) into a molding cavity and a smooth release of a molded product from the molding cavity. The application of such a lubricant is manually effected at an interval of the molding cycle in which a predetermined number of molded products are produced.

Various devices, including a delivery device, a funnel and a baffle etc. are complicatedly provided above the molding dies of the bottle making machine, and accordingly, there is no space for providing an automatic lubricant applying apparatus above the molding dies. This is one of the reasons that no automatic lubricant applying device can be realized.

Another reason is a difficulty in controlling an application time and in maintaining a uniform thickness of a lubricant applied onto the molding surface. In particular, an excess application of lubricant causes an undesirable piece, such as a so-called black point, stuck to a molded product, resulting in a decreased quality of molded product.

In addition to the foregoing, in the prior art, during the application of lubricant, the operation is interrupted, that is, no gob can be charged, thus resulting in a reduced productibility.

The primary object of the present invention is to provide an apparatus for automatically and uniformly applying lubricant onto a molding die from above without interrupting the operations (delivery etc.) of the glass making machine.

SUMMARY OF THE INVENTION

To achieve the object of the present invention, according to the present invention, there is provided an apparatus for applying lubricant onto a molding die in a glass bottle making machine, comprising a spraying nozzle for spraying a mist of lubricant mixed with air onto an inner surface of the molding die, located in a space defined above the molding die, and a cylinder which is connected to the spraying nozzle to reciprocally move the latter between a spraying position in which the spraying nozzle is located directly above the molding die and an inoperative position apart from spraying position.

BRIEF DESCRIPTION OF THE DRAWINGS

The invention will be described below in detail with reference to the accompanying drawings, in which.

DESCRIPTION OF PREFERRED EMBODIMENTS

Figure 1:
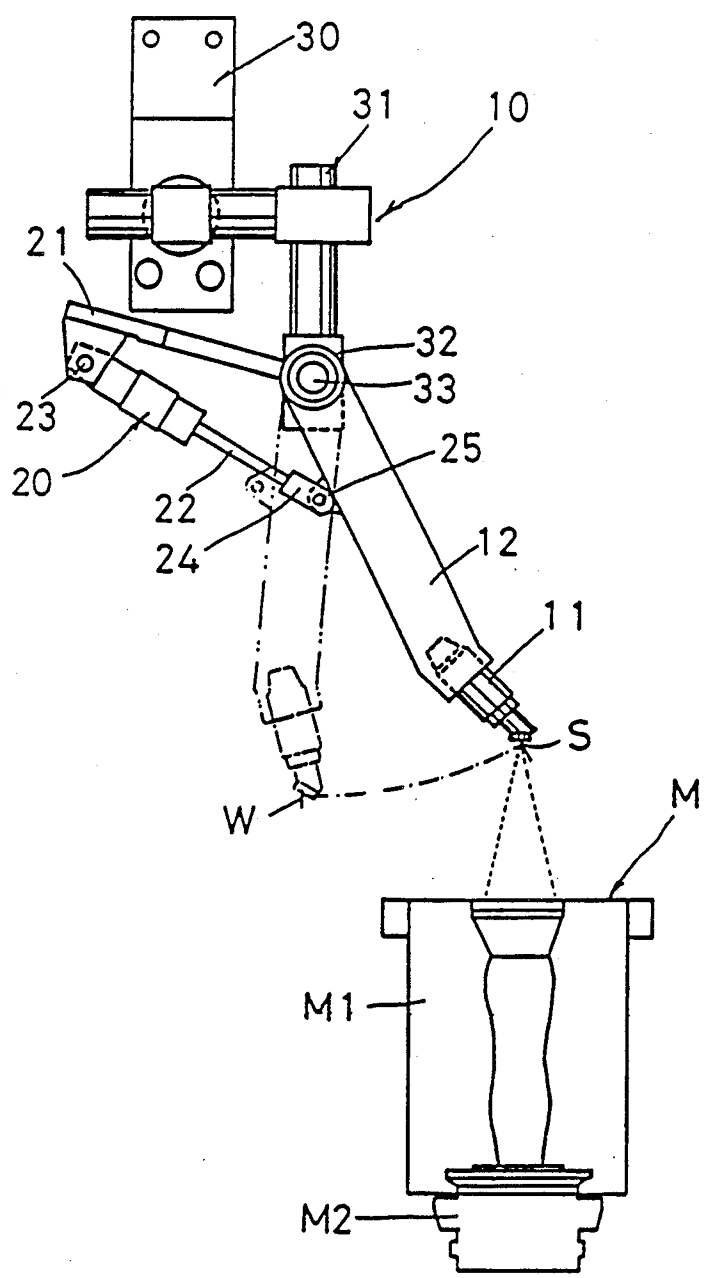
FIG. 1 is a side elevational view of an apparatus for applying lubricant onto a molding die in a glass bottle making machine, according to an aspect of the present invention.
Figure 2:
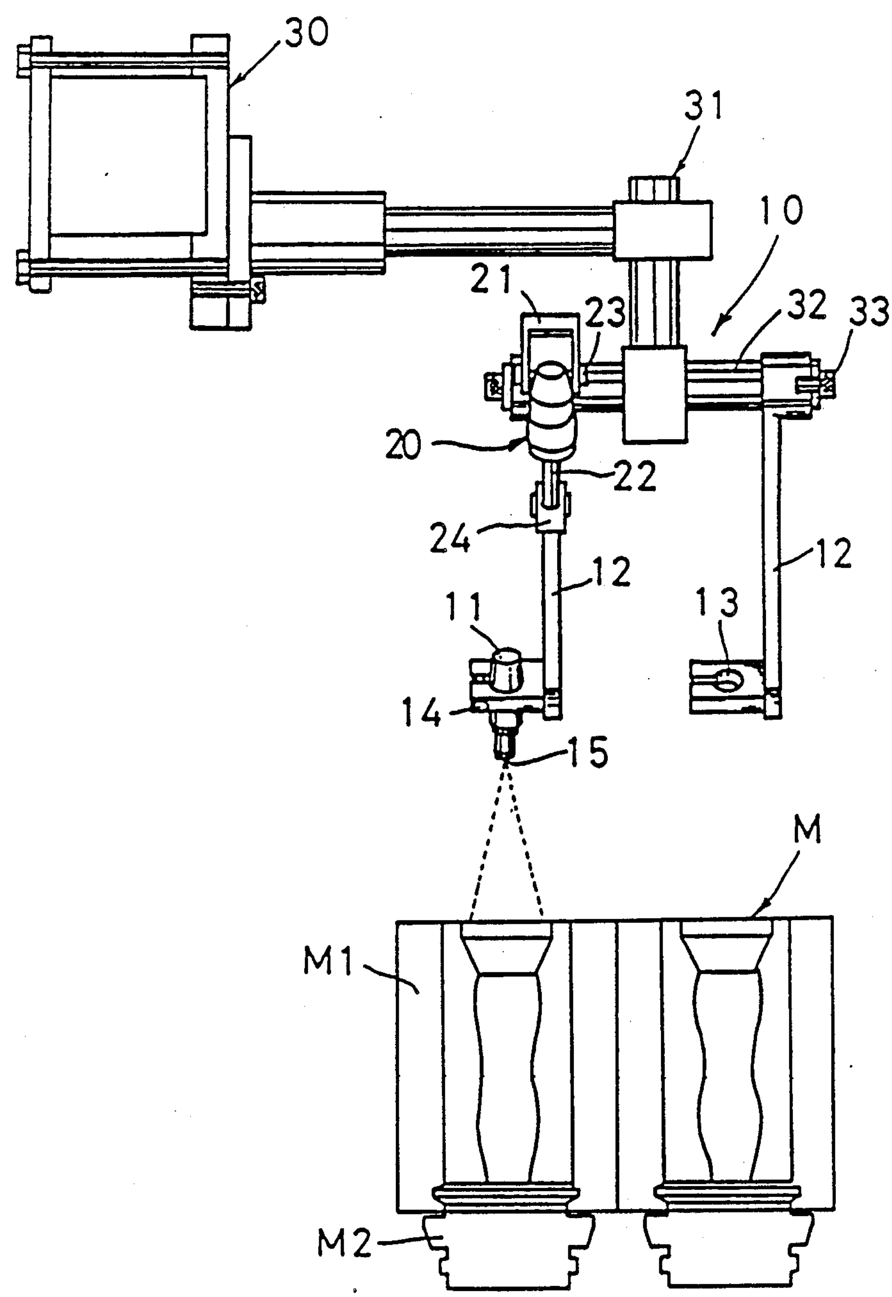
FIG. 2 is a front elevational view of FIG. 1.

As can be seen from FIGS. 1 and 2, a lubricant applying apparatus 10 of the present invention has a spraying nozzle 11 which has an ejection opening 15 and which is located above a molding die M of a glass bottle making machine to intermittently spray a mist of lubricant mixed with air onto an inner surface of a rough molding die M1 and a mouth molding die M2 of the molding die M.

The lubricant applying apparatus 10 is placed so that it does not interfere with the operations of devices (not shown) of a glass bottle making machine, such as a delivery device or a baffle, located above the rough molding die M1. To this end, in the illustrated embodiment, lubricant applying apparatus 10 is located above to be offset from the axis of the molding die M. That is, the lubricant applying apparatus 10 is located in a space defined above in an inclined direction with respect to the molding die M.

The nozzle 11 can be reciprocally moved between an inoperative position W in which the nozzle does not interfere with the operations of the various devices (not shown) of the glass bottle making machine located above the molding die M and an operative position, i.e. a spraying position S in which the nozzle 11 is located directly above the molding die M so as to spray the lubricant (mist) into the molding die M. The actuator for reciprocally moving the nozzle 11 between the operative position S and the inoperative position W will be described hereinafter.

As shown in FIG. 2, the spraying nozzle 11 is attached to a mounting hole 13 formed at a front end of a generally L-shaped arm 12, by means of a set screw 14. In the illustrated embodiment, two arms 12 are rotatably connected to opposite ends of a shaft 32 of an arm holder 31 by means of set screws 33. The arm holder 31 is integrally connected to a manifold 30.

The actuator of the nozzle 11, i.e. a hydraulic cylinder device 20 is attached to the shaft 32 through a mounting member 21 secured thereto. The cylinder device 20 has a piston rod 22 which is connected to the L-shaped arm 12, so that the L-shaped arm 12 can be rotated about the axis of the shaft 32 by the operation of the piston rod of the cylinder device 20.

In FIGS. 1 and 2, numeral 23 designates a set screw for securing the mounting member 21 to the cylinder device 20, 24 a mounting portion of the piston rod 22 of the cylinder device and the L-shaped arm 12, and 25 a mounting pin which rotatably connects the mounting potion 24 to the L-shaped arm 12.

As can be understood from the above discussion, when the cylinder device 20 operates to move the L-shaped arms 12, the nozzles 11 reciprocally move in an archwise motion between the operative position S (spraying position) and the inoperative position W.

Figure 4:
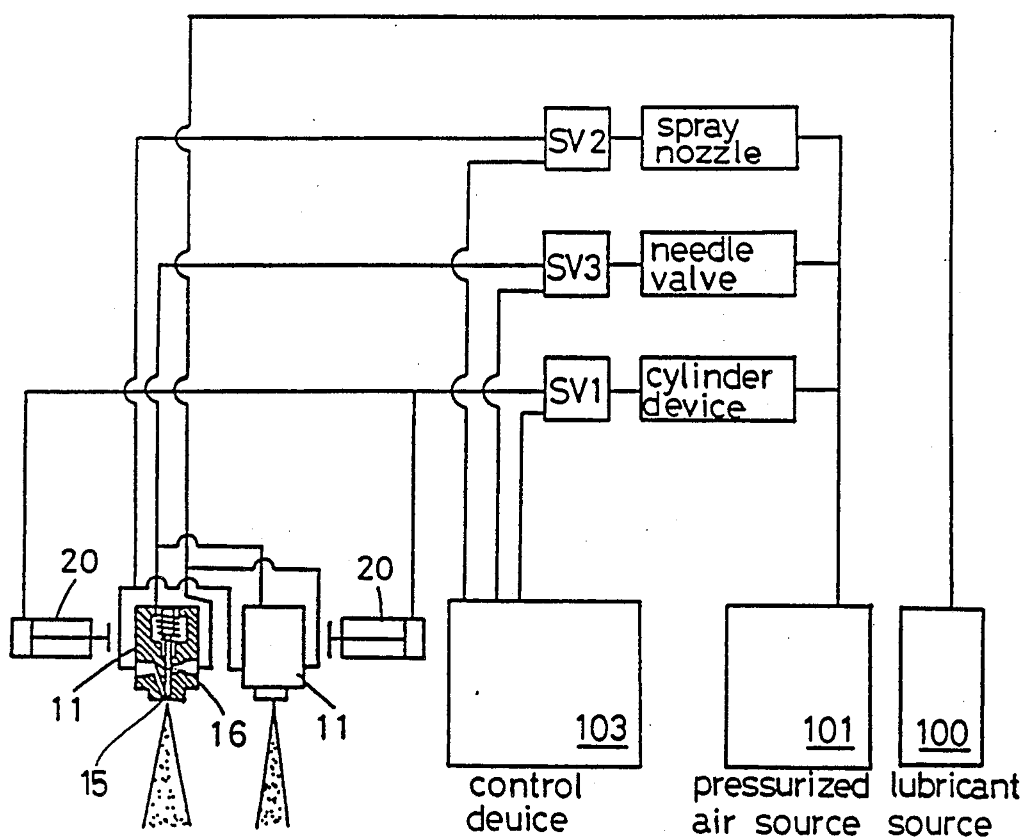
FIG. 4 is a schematic block diagram showing the operation of an apparatus for applying lubricant onto a molding die in a glass bottle making machine, according to the present invention.

The reciprocal movements of the arms 12 and accordingly the nozzles 11 and the spraying of the lubricant (mist) from the nozzles 11 in the operative position S can be effected by a same pneumatic pressure source, as shown in FIG. 4.

Namely, as shown in FIG. 4, the spraying nozzle 11 used in the illustrated embodiment is a so-called automatic air spraying type nozzle which is connected to a source 100 of lubricant through a needle valve 16, so that the lubricant can be fed to the ejection opening 15 of the nozzle 11. The nozzle 11 is also connected to a source 101 of highly pressurized air, so that the lubricant can be ejected from the ejection opening 15 as a mist of lubricant and air with the help of the pressurized air fed to the ejection opening 15 from the pressurized air source 101.

The operation of the needle valves 16 of the spraying nozzles 11 and the operation of the cylinder device 20 of the L-shaped arms 12 are effected by the pressurized air fed from the pressurized air source 101. The feed of the pressurized air for the above-mentioned operations are controlled by respective electromagnetic valves SV1, SV2 and SV3 which are connected to a control device 103.

Figure 5:
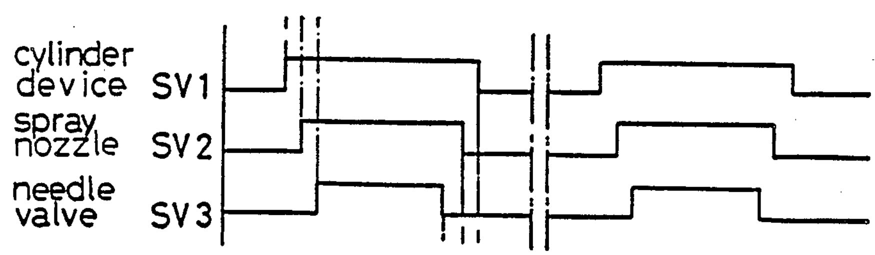
FIG. 5 is a timing chart of the operations in an apparatus for applying lubricant onto a molding die in a glass bottle making machine, according to the present invention; and, FIG. 6 is a schematic plan view of an apparatus for applying lubricant onto a molding die according to the present invention in connection with the operations of a glass bottle making machine to which the present invention is applied.

In the illustrated embodiment, as shown in FIG. 5, for one molding die M, the cylinder device 20 intermittently operates for example every 15–20 minutes and the electromagnetic valve SV1 is maintained ON for a very short period (e.g. 0.6–0.7 second) in which the gob (of molten glass) can be charged in the molding die. After the electromagnetic valve SV1 of the cylinder device 20 for actuating the L-shaped arms 12 is made ON, the electromagnetic valve SV2 for the spraying operation of the nozzle is made ON, and then, the electromagnetic valve SV3 for the feeding operation of the lubricant (mist) is made ON. As a result, the lubricant (mist) is sprayed from the nozzle 11 for about 0.4 second. After that, the electromagnetic valves SV3, SV2 and SV1 are made OFF in this order.

It should be appreciated that although the illustrated embodiment is addressed to a dual type spraying system in which lubricant is sprayed into two molding dies at one time from the respective spraying nozzles, it is possible to simultaneously spray lubricant into a triple molding die system (three molding dies) or more than three molding dies from three spraying nozzles or more than three spraying nozzles.

Figure 3:
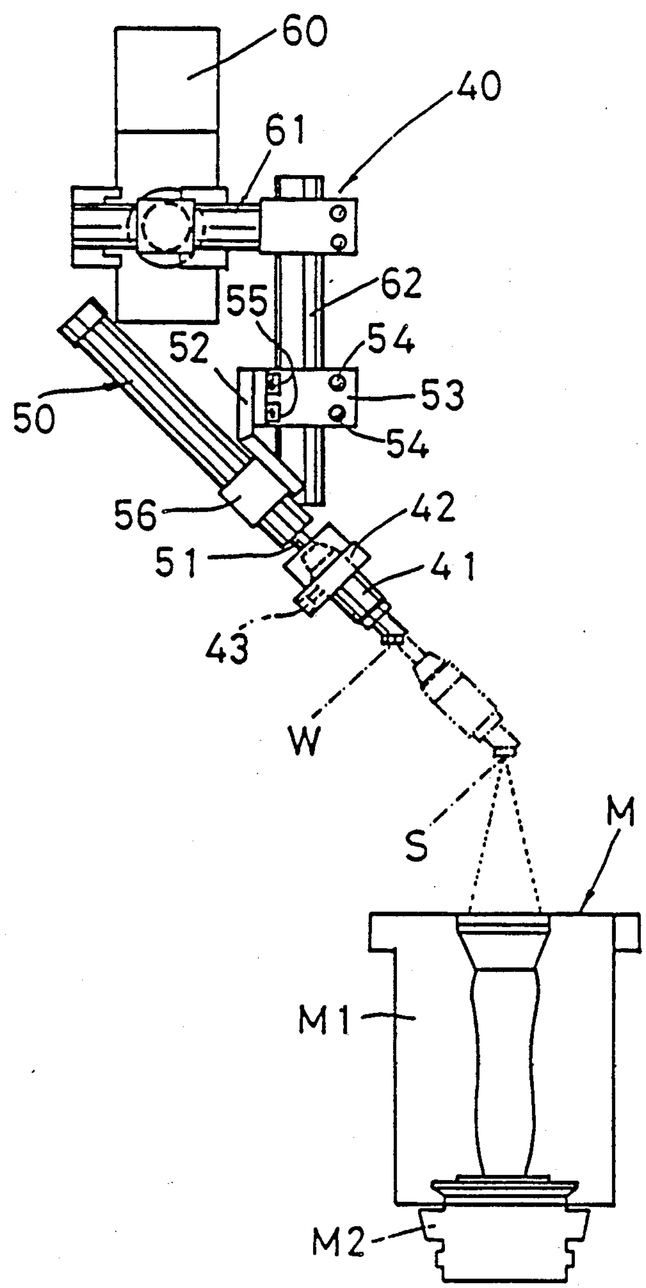
FIG. 3 is a side elevational view of an apparatus for applying lubricant onto a molding die in a glass bottle making machine, according to another aspect of the present invention.

FIG. 3 shows a lubricant spraying apparatus 40 according to another embodiment of the present invention, in which the spraying nozzle 41 is directly connected to the piston rod 51 of the cylinder device 50.

Namely, in FIG. 3, a shaft 62 of a connecting member 61 which is integrally connected to the manifold 60 has a cylinder holding member 52 which is connected thereto through a generally L-shaped plate member 53 and which is inclined at a predetermined oblique angle with respect to the shaft 62. In FIG. 3, numeral 54 designates mounting pins of the L-shaped plate member 53 to the shaft 62, and 55 set screws which are adapted to secure the cylinder holding member 52 to the L-shaped plate member 53. The cylinder 50 is held by the cylinder holding member 52 through a mounting member 56. To a front end of a piston rod 51 of the cylinder device 50 is connected a spraying nozzle holding member 42 which holds the spraying nozzle 41 connected thereto by means of set screws 43.

The lubricant spraying apparatus 40 shown in FIG. 3 is also located in a space above the molding die M (FIG. 1) in an inclined direction therefrom, so that the spraying nozzle 41 can be linearly moved between the operative position (spraying position) S and the inoperative position W by the operation of the cylinder device 50. Namely, the reciprocal movement of the spraying nozzle between the operative position and the inoperative position takes place along an archwise track in the first embodiment shown in FIGS. 1 and 2, and along a linear track in the modified embodiment shown in FIG. 3.

In the embodiments mentioned above, the lubricant applying device is provided for each molding section of the glass bottle making machine. Alternatively, it is also possible to provide a single lubricant applying device which can move along a plurality of molding sections to successively spray lubricant to the associated molding sections.

Figure 6:
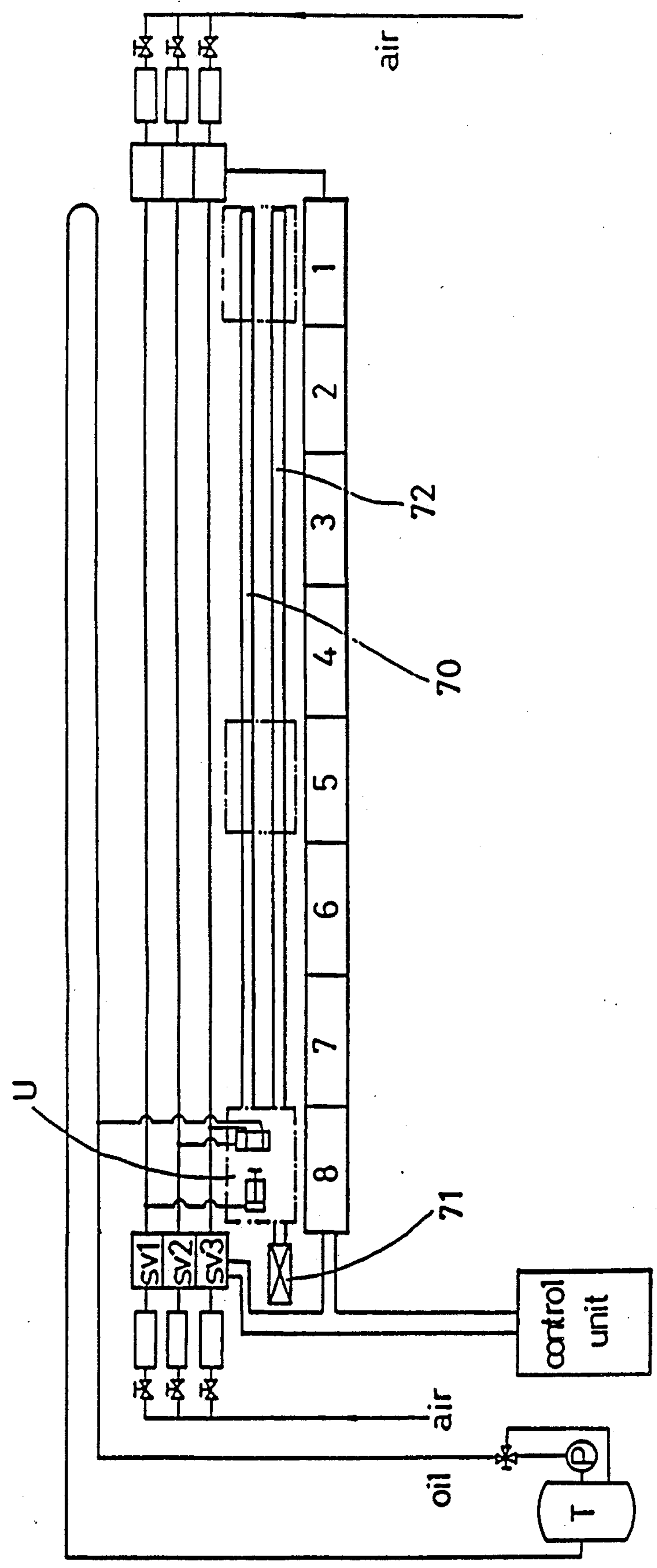

FIG. 6 shows a lubricant applying unit U according to the present invention which successively moves along eight molding sections of a glass bottle making machine. In the arrangement shown in FIG. 6, the unit U is guided by a guide rail 70 so as to move therealong. The unit 70 is screw-engaged by a ball-screw rod 72 which extends in parallel with the guide rail 70 and which is driven to rotate by a predetermied angular displacement by a servo motor 71, so that the unit U moves along the molding sections in a predetermined sequence (e.g. the order of the feeding of gob of molten glass) to successively spray lubricant into the molding sections.

As can be seen from the foregoing, according to the present invention, since the spraying nozzle for spraying a mist of lubricant mixed with air into the molding die is located in an upper space above the molding die so as not to interfere with various devices of the glass bottle making machine, and since the spraying nozzle can reciprocally be moved between the spraying position (operative position) directly above the molding die and the inoperative position apart from the operative position by the cylinder device, the spraying nozzle can apply the lubricant onto the inner surface of the molding die without interfering with the devices of the glass bottle making machine even during the operation of the glass bottle making machine.

Furthermore, according to the present invention, since the reciprocal movement of the spraying nozzle can be effected within an extremely short space of time (0.6–0.7 second in the illustrated embodiment), the application of lubricant can be effected without interrupting the operation of the charging device of a gob of molten glass, thus resulting in an increased productibility.

In addition, since the lubricant is sprayed in the state of mist containing air from above the molding die by the spraying nozzle, an uniform application of the lubricant can be realized, and accordingly the invention can be applied either to a blow-blow type of glass bottle making system or to a press-blow type of glass bottle making system.

Finally, since the spraying nozzle can be reciprocally moved by the hydraulic cylinder device, the invention can be applied to a variable speed type of glass bottle making machine.

We claim:

1. In a glass bottle making machine, having an array of a plurality of molding sections, each section having a molding die, a spraying nozzle for spraying a mist of lubricant mixed with air onto an inner surface of each said molding dies, said spraying nozzle, at the time of said spraying, being located in a defined space above each said molding dies, an actuator connected to said spraying nozzle for reciprocating the latter between a spraying position in which the spraying nozzle is located directly above each of said molding dies to spray a mist of lubricant onto the inner surface of each of said molding dies and an inoperative position apart from said spraying position, the improvement comprising a guide rail and means for moving said spraying nozzle and said actuator along said guide rail to said defined space above each said molding die.

2. A glass bottle making machine according to claim 1, wherein said actuator comprises a hydraulic cylinder associated with the spraying nozzle.

3. A glass bottle making machine according to claim 1, wherein the actuator includes means which cause reciprocation of the spraying nozzle between the spraying position and the inoperative position to take place along a curved path.

4. A glass bottle making machine according to claim 1, wherein the actuator includes means which cause reciprocation of the spraying nozzle between the spraying position and the inoperative position to take place along a linear path.

5. A glass bottle making machine according to claim 1, further comprising a servo motor means for driving said spraying nozzle along said guide rail.

6. A glass bottle making machine according to claim 5, further comprising a ball-screw connected to said servo motor means, said spraying nozzle being connected to said ball-screw.

* * * * *